US005101553A

United States Patent [19]

Carey

[11] Patent Number: 5,101,553

[45] Date of Patent: Apr. 7, 1992

[54] METHOD OF MAKING A METAL-ON-ELASTOMER PRESSURE CONTACT CONNECTOR

[75] Inventor: David H. Carey; David M. Sigmond, both of Austin, Tex.

[73] Assignee: Microelectronics and Computer Technology Corporation, Austin, Tex.

[21] Appl. No.: 693,264

[22] Filed: Apr. 29, 1991

[51] Int. Cl.[5] .................... H02G 15/00

[52] U.S. Cl. .................... 29/882; 29/883; 29/530

[58] Field of Search .................... 29/882, 883, 530; 165/80.2, 185; 361/386, 388; 156/171, 178, 184, 193; 264/139

[56] References Cited

U.S. PATENT DOCUMENTS

| | | | |
|---|---|---|---|
| 3,852,878 | 12/1974 | Munro | 29/883 X |
| 3,982,320 | 9/1976 | Buchoff et al. | 29/883 |
| 3,991,463 | 11/1976 | Squitieri et al. | 29/883 |
| 4,993,482 | 2/1991 | Dolbear et al. | 165/80.2 |

OTHER PUBLICATIONS

Fulton et al., "The Use of Anisotropically Conductive Polymer Composites for High Density Interconnection Applications", *Proceedings of the National Electronics Packaging and Production Conference* (Nepcon) West 1990,pp. 32–46.

Yonekura, "Oriented Wire Through Connectors for High Density Contacts", *Proceedings of the National Electronics Packaging and Production Conference* (Nepcon) West 1990, pp. 57–71.

Zifcak et al., "Pinless Grid Array Connector", *6th Annual International Electronics Packaging Conference* (IEPS), Nov. 17–19, 1986, San Diego, Calif., pp. 453–464.

"Reliable Connections Under Pressure", advertisement by Shinetsu, *Electronics Packaging and Production* (EP&P), date and page unknown).

Buchoff, "Elastometric Connectors for Land Grid Array Packages", reprinted from *Connection Technology*, Apr., 1989, pp. 15–18.

"Matrix MOE Elastomeric Connectors", *ETI Technical Data Sheet* by Elastomeric Technologies, Inc.

Smolley, "Button Board a New Technology", *Fourth Annual International Electronics Packaging Society Conference*, Oct. 29–31, 1984, Baltimore, Md., pp. 75–91.

Buchoff, "Solving High Density Electronic Problems with Elastomeric Connections", *Proceedings of the National Electronics Packaging and Production Conference* (Nepcon) West 1990, p. 307.

*Primary Examiner*—Timothy V. Eley
*Attorney, Agent, or Firm*—David M. Sigmond

[57] ABSTRACT

A method of making a metal-on-elastomer pressure contact connector. The method includes embedding a plurality of parallel co-planar copper-beryllia wires comprising a plurality of coils in a silicone rubber elastomer with top and bottom surfaces, and removing metal from the tops and bottoms of the coils to form a pair of isolated wire filaments from each coil which extend from the top surface to the bottom surface of the elastomer. The filaments form arrays of electrical contacts above and below the elastomer exceeding 10,000 contacts per square inch.

36 Claims, 5 Drawing Sheets

Fig. 1
PRIOR ART
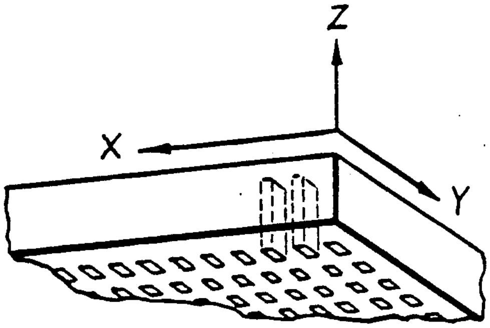
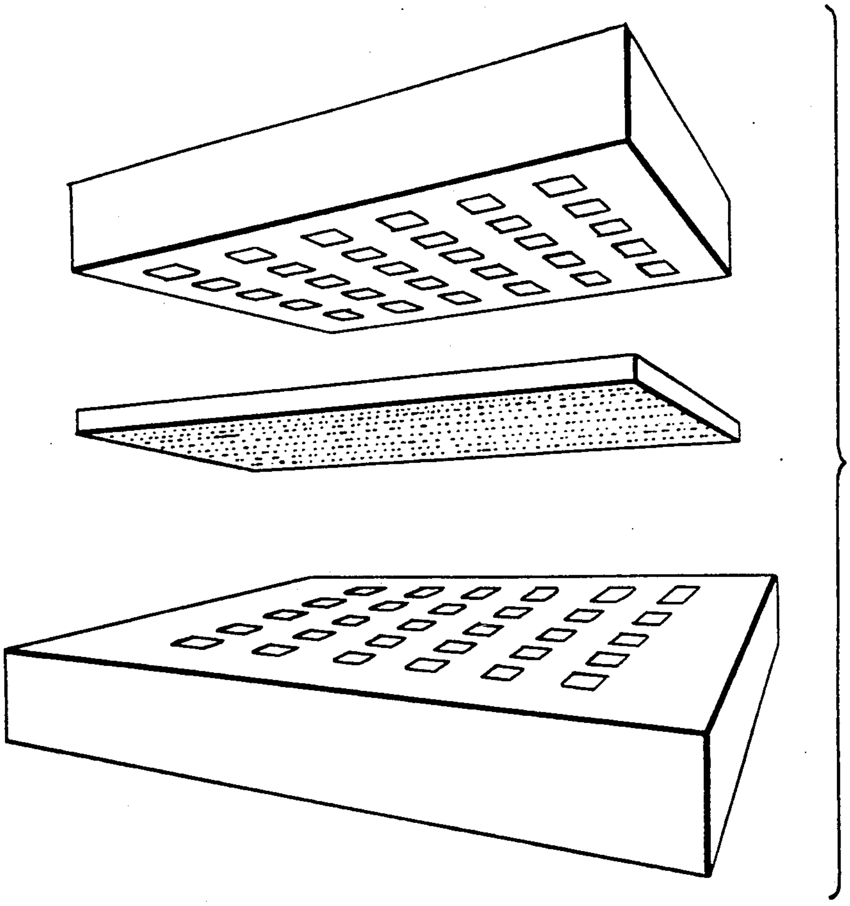
Fig. 2
PRIOR ART
Fig. 3
PRIOR ART
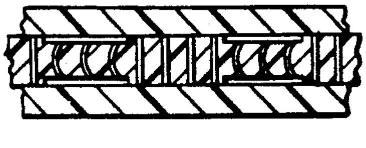

METHOD OF MAKING A METAL-ON-ELASTOMER PRESSURE CONTACT CONNECTOR

BACKGROUND OF THE INVENTION

1. Field of the invention

The invention relates to the fabrication of an electrical connector, and more particularly to a method of making a metal-on-elastomer connector containing vertically oriented thin wire filaments in an elastomeric mat.

2. Description of Related Art

Packaging components with high density pad configurations are often surface mounted on underlying interconnect structures such as substrates, printed circuit boards, and printed wiring boards. At times, electrical connection must be made between aligned opposing electrical contact areas. This is frequently the case with pad grid arrays (or land grid arrays) which contain flush contact areas. Opposing contact areas, however, may be difficult to solder, and may exhibit height variations from plating thicknesses, substrate warp, and non-planarities. Various connection schemes including high bump soldering have proven unreliable or expensive.

Elastomeric connectors have been developed for compliant high density interconnection which accommodates height variations between aligned opposing electrical contacts on two generally parallel surfaces. There are two basic types of metal-elastomer connectors: the layered elastomeric element and the elastomeric metal-on-elastomer. The layered elastomeric element comprises alternating layers of conductive and non-conductive silicone rubber, for instance 200 layers per inch.

Metal-on elastomer ("MOE") connectors, to which the present invention is directed, are now described. As seen in FIG. 1, the connectors contain vertically oriented (anisotropic) conductive filaments in a non-conductive elastomer. Metal filaments are normally preferred, but carbon fibers or conductive rubber rods may also be used. The filaments are separated and electrically isolated from one another, for instance 2 mil filaments on a 4 mil pitch, and may be distributed in linear, triangular, or square patterns. Thus, the connectors are electrically conductive in only one (Z-axis) direction and non-conductive in two (X- and Y-axis) directions. The elastomeric mat must maintain its spring force by virtue of it,s elasticity. Silicone rubber is the most widely used elastomeric material.

As seen in FIG. 2, a MOE connector is sandwiched between surfaces containing opposing electrical contacts. The opposing electrical contacts must be aligned with one another. However, since the area of the opposing contacts is much greater than the area of the wire filaments, the filaments need not be registered or aligned with the contacts. This highly significant feature is referred to as "redundant contact connection."

As shown in cross-section in FIG. 3, the components are mechanically secured together, the connector is compressed (e.g. 10%-40%), and the wire filaments provide electrical interconnection between opposing contacts. Only those filaments that touch the contacts provide paths for electrical conduction. A limited range of contact force is required to assure low contact resistance and vertical accommodation. By way of example, a clamping mechanism may apply 10 psi to compress the connector. Too small a force, such as 5 psi, may result in poor interconnection in areas of non-planarity; whereas too great a force, for instance 100 psi, may crush the connector.

In addition to vertical compliance, connection of aligned opposing contacts by MOE connectors has the advantages of simple mounting, removal and replacement, a wide range of geometries, lack of thermal stress from soldering, lack of chemical damage from fluxes or cleaning solvents, small pressures (10-20 psi), low inductance and low impedance. Furthermore, MOE connectors have been found to transmit high frequencies (2 GHz) without distortion, and to have low contact resistance (typically 10-100 milliohms).

Methods have formerly been developed in order to manufacture MOE connectors. Yonekura, "Oriented Wire Through Connectors For High Density Contacts," *Nepcon West* 1990, pp. 57-71 describes prebent wires oriented and embedded in a silicone elastomer. Zifcak et al, "Pinless Grid Array Connector," *6th Annual International Electronics Packaging Conference*, Nov. 17-19, 1986, San Diego, Calif., pp. 453-464 uses a mechanically-frothed urethane foam with high retained stress in compression (i.e. low stress relaxation). The foam is machined to provide conductor openings and alignment holes. In particular, the conductor openings are produced by drilling two 0.020 inch diameter holes side-by-side at a 30 degree angle. The article also mentions conductor openings may be made by cutting, punching, or molding in place. Shaped rectangular conductors are then inserted in the conductor openings. Buchoff, "Elastomeric Connectors For Land Grid Array Packages," *Connection Technology*, April 1989, pp. 15-18 describes metal traces of gold on nickel on copper formed on the silicone rubber core surface. The article further describes using round wires which remain below the rubber surface during deflection, breaking contact. In "Matrix MOE Elastomeric Connectors," *Technical Data Sheet*, Elastomeric Technologies, Inc., the MOE's consist of gold conductive paths laminated to electrically insulating silicone. An additional technique known in the art is the use of magnetic levitation to orient ferromagnetic wires prior to curing an elastomeric material.

Therefore the related art does not teach how to manufacture metal-on-elastomer connectors in a relatively simple, low cost manner. The importance of MOE connectors in high density electronics packaging suggests a need for such a method.

SUMMARY OF THE INVENTION

An object of the present invention is to provide a method of making MOE redundant contact pressure connectors with a few simple processing steps.

Another object is to provide an MOE connector with non-ferromagnetic wire filaments.

An additional object is to provide a MOE connector for high density packaging applications.

A feature of the present invention is a method of making a metal-on-elastomer pressure contact connector, comprising, in sequence, embedding a metal wire comprising a plurality of coils in an elastomer with top and bottom surfaces, and removing metal from the tops and bottoms of the coils to form a pair of isolated wire filaments from each coil which extend from the top surface to the bottom surface of the elastomer.

These and other objects, features and advantages of the present invention will be more readily apparent from a review of the detailed description and preferred embodiments which follow.

BRIEF DESCRIPTION OF THE DRAWINGS

The following detailed description of the preferred embodiments can best be understood when read in conjunction with the following drawings, wherein:

FIG. 1 shows a pictorial view of a portion of a MOE connector provided in the prior art.

FIG. 2 shows a pictorial view of a MOE connector sandwiched between aligned opposing electrical contacts as provided in the prior art.

FIG. 3 shows a vertical cross-section through a portion of the MOE connector interconnecting the contacts as provided in the prior art.

DETAILED DESCRIPTION OF THE PREFERRED EMBODIMENTS

Figure 4:
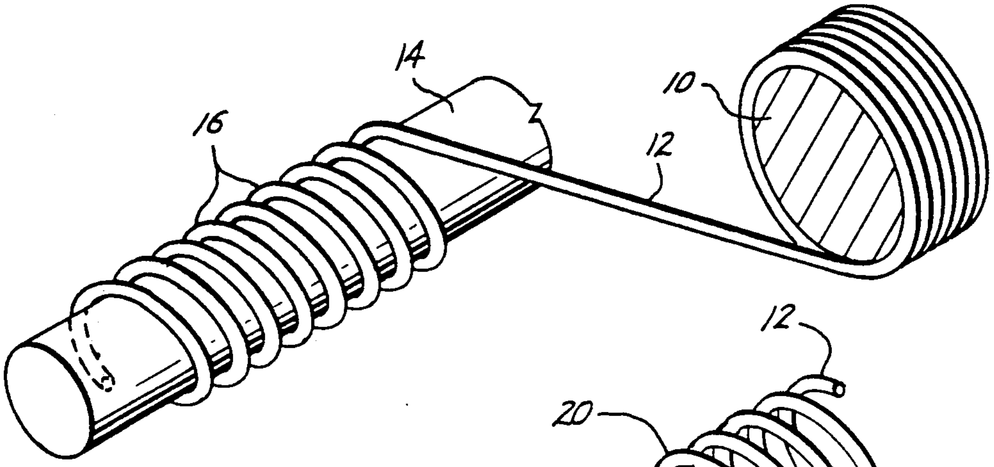
FIG. 4 shows an isometric projection of a wire coil being formed about a rod.
Figure 5:
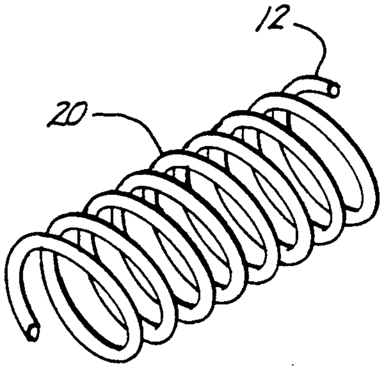
FIG. 5 shows an isometric view of a coiled wire as formed in FIG. 4.

Referring now to the drawings wherein depicted elements are not necessarily shown to scale and wherein like or similar elements are designated by the same reference numeral through the several views and, more particularly to FIG. 4, the present invention method of making a metal-on-elastomer pressure contact connector is now described. Reel 10 contains a spool of 1 mil diameter copper-beryllia wire 12. Copper-beryllia is a highly conductive stand alone metal which, unlike pure copper, does not require plating to prevent corrosion. Also shown is a 3 mil diameter hardened steel mandrell or rod 14. Wire 12 is wound around rod 14 to form a plurality of identically-shaped continuous coils 16 with 5 mil diameters and a coil-to-coil pitch of 3 mils. With reference now to FIG. 5, a section of wire 12 that was wrapped around rod 14 is cut and removed from reel 10. In addition, rod 14 is removed from the inside of coils 16. As a result, the section forms a linear coiled metal wire 20.

Figure 6:
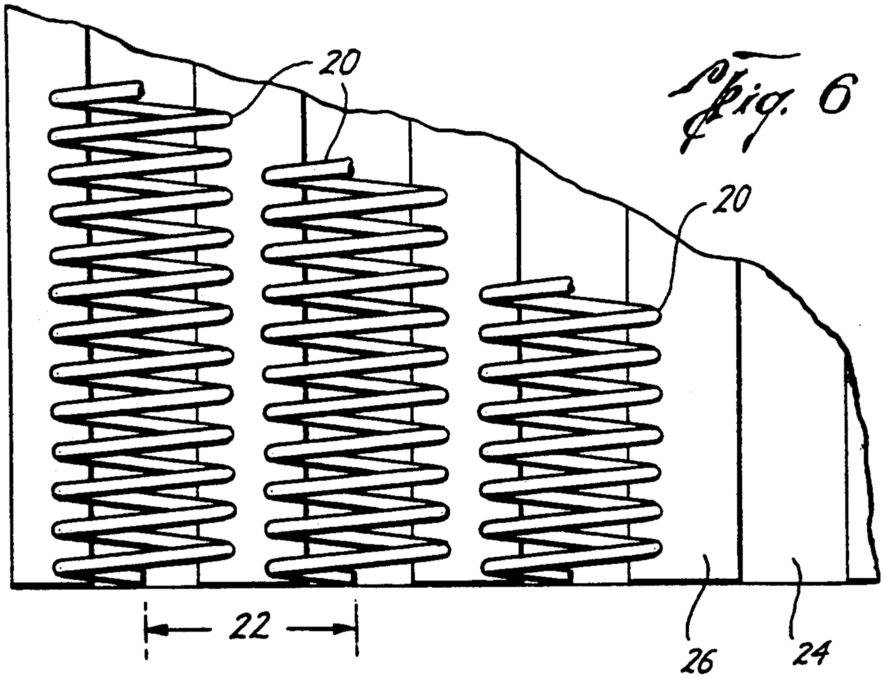
FIG. 6 shows a top plan view of a plurality of coiled wires laid in parallel co-planar rows.
Figure 7:
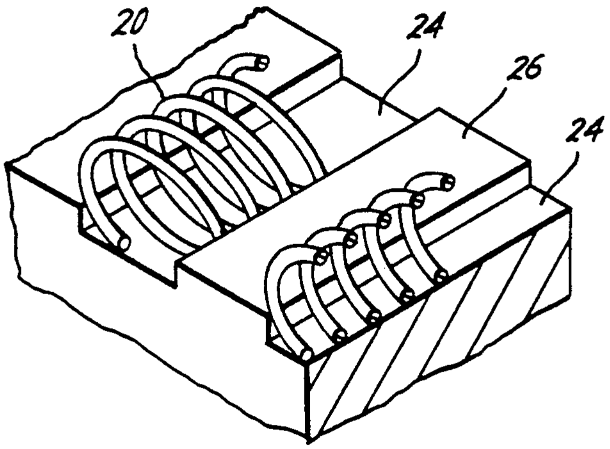
FIG. 7 shows an isometric projection of the coiled wires placed in recessed grooves.

Referring now to FIG. 6, a plurality of coiled wires 20 are arranged on their sides in closely positioned, spaced, parallel co-planar rows. The center-to-center distance 22 between coiled wires 20 is 10 mils. As best seen in FIG. 7, this arrangement can result from placing wires 20 in parallel recessed grooves 24 of surface 26.

Figure 8:
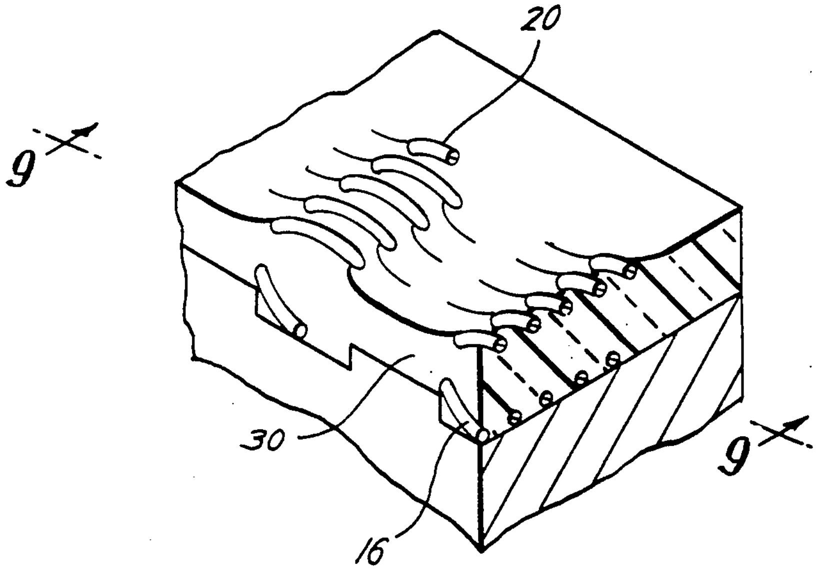
FIG. 8 shows a view similar to FIG. 7 with a layer of curable elastomer backfilled into the coils.

With reference now to FIG. 8, coils 16 are backfilled with a layer of curable non-conductive silicone rubber 30. This can be achieved by film casting, dip casting, coating, or doctor blading. While each of these methods can provide a layer somewhat thinner than the height of the coils, a wicking action might cause the elastomer to coat at or near the tops of the coils, as will be described.

Figure 9:
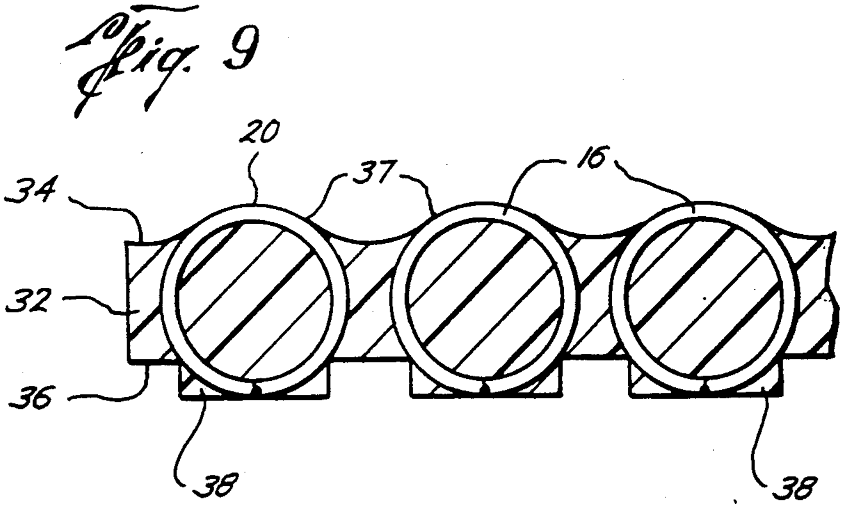
FIG. 9 shows a vertical cross-section taken along line 9—9 of FIG. 8 showing the coils embedded in a cured elastomeric mat removed from the grooves.

With reference now to FIG. 9, silicone rubber 30 is cured and coils 16 are embedded therein. Silicone rubber 30 forms a elastomeric mat 32 with a top surface 34 above the centers of the coils and a bottom surface 36 below the centers of the coils. Top surface 34 includes wicked protrusions 37 and bottom surface 36 includes corrugations 38 corresponding to grooves 24. In addition, mat 32 holds coils 16 in place relative to one another.

Figure 10:
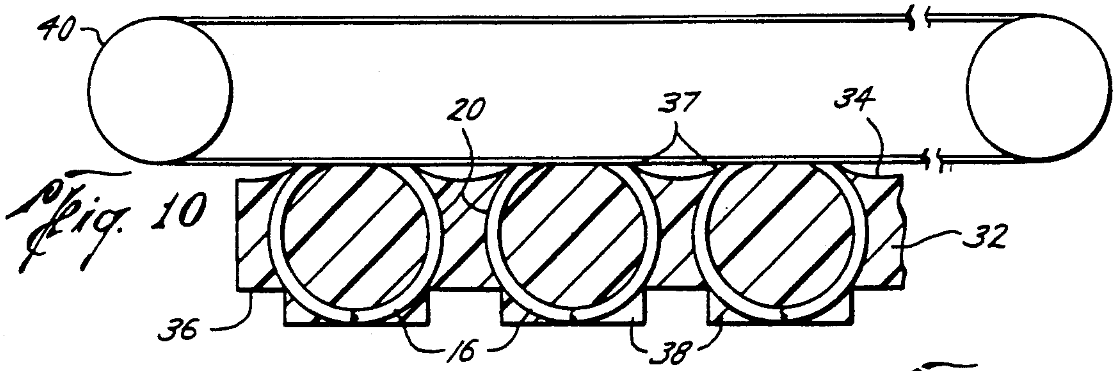
FIG. 10 shows a view similar to FIG. 9 with a belt grinder abrading the tops of the coils.
Figure 11:
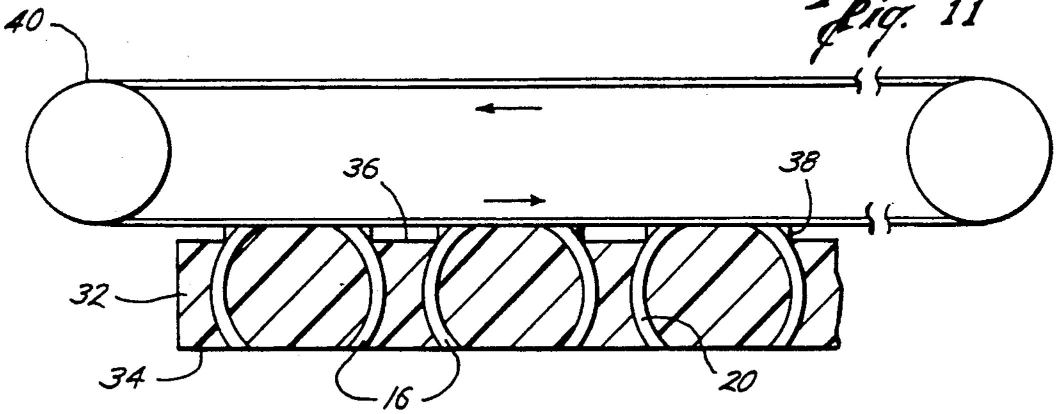
FIG. 11 shows a view similar to FIG. 10 with a belt grinder abrading the bottoms of the coils.

Referring now to FIG. 10, the tops of coils 16 are mechanically abraded and removed by belt grinder 40. Likewise, as seen in FIG. 11, mat 32 is inverted and belt grinder 40 abrades and removes the bottoms of the coils as well.

Figure 12:
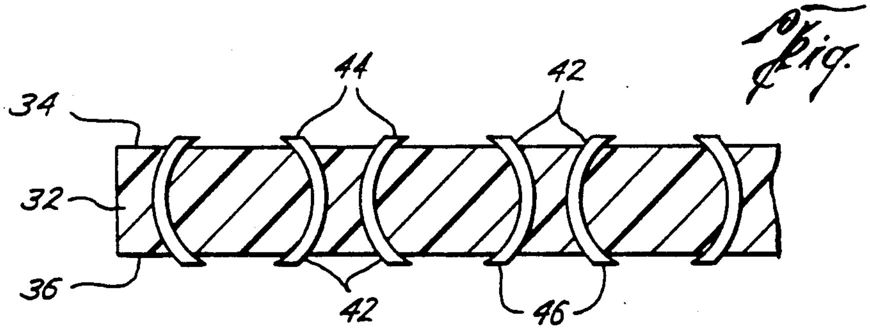
FIG. 12 shows a view similar to FIG. 11 after the tops and bottoms of the coils are removed leaving a pair of wire filaments formed from each coil.

As a result, as shown in FIG. 12 (with mat 32 now upright), each coil 16 is converted into a pair of wire filaments 42 with top or first ends 44 and bottom or second ends 46. For illustration purposes belt grinder 40 has contacted all of surfaces 34 and 36 thereby removing protrusions 37 and corrugations 38, as well as leaving ends 44 and 46 in and aligned with surfaces 34 and 36, respectively. However, if desired, belt grinder 40 could contact only protrusions 37 and corrugations 38 to assure ends 44 and 46 protrude from at least portions of surfaces 34 and 36, respectively. Nonetheless, as best seen in FIG. 12, after belt grinding, filaments 42 may exhibit a slight "spring-back" (straightening) whereby first ends 44 protrude above elastomer top surface 34, and second ends 46 protrude below elastomer bottom surface 36. Thus first ends 44 shall be on or above top surface 34 and second ends 46 shall be on or below bottom surface 36. Furthermore, each filament's first end 44 is electrically connected to it's second end 46, and each wire filament 42 is spaced from and electrically isolated from the other filaments. The inductance of each filament 42 is approximately 100 picohenrys.

Figure 13:
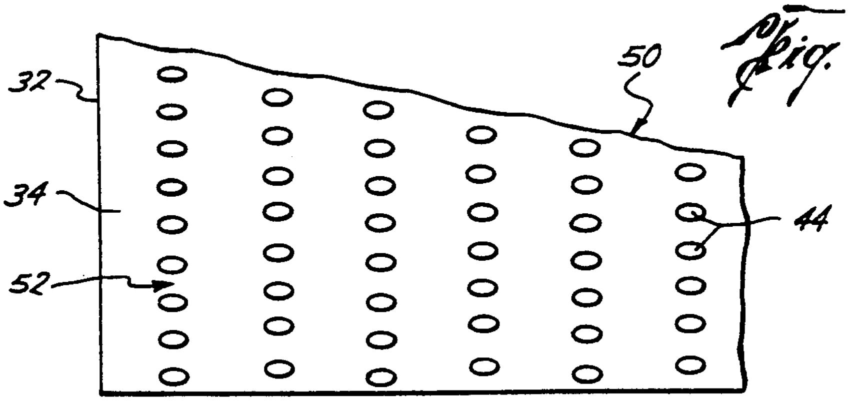
FIG. 13 shows a top plan view of the array of contacts formed by the wire filaments on the top surface of the elastomeric mat.

With reference now to FIG. 13, the final connector structure 50 is seen. First filament ends 44 form an upper array 52 of electrical contacts protruding above elastomer mat's top surface 34. Likewise, second filament ends 46 (not shown) form a similar lower contact array protruding below elastomer mat surface 36 directly beneath ends 44. Along the X-axis, which traverses each wire 20, the 10 mil center-to-center spacing between adjacent wires assures 200 contacts per inch. Along the Y-axis, which runs parallel to so the rows of wires, the 3 mil spacing between adjacent coils assures 330 contacts per inch. This yields a contact density of 66,000 contacts per square inch for upper contact array 52 as well as the lower contact array.

MOE connector 50, fabricated in accordance with the present invention, can now be sandwiched between a pair of electronic components to interconnect aligned opposed electrical contacts, as shown in FIGS. 2 and 3.

Finally, it is important to note that while the presently preferred embodiment of the present invention has been described for the purpose of disclosure, numerous other changes and modifications in the details of construction, arrangement of parts and steps of processing can be carried out. For instance, the diameter and length of the coils, contact density, elastomeric material, et cetera can be tailored to the electrical and mechanical characteristics of a specific application. While the metal must be electrically conductive, remaining are a wide range of metals including conductive non-ferromagnetic metals, copper, copper-silver, copper plated with nickel or gold, nickel, and gold. To inhibit corrosion, the metal can be coated with a noble metal. The coils can assume a wide variety of shapes, such as circles, hexagons, or vertically elongated ovals which produce nearly straight filaments. Straight (or relatively straight) filaments are normally preferred for mounting; whereas bent filaments are preferred for testing which requires multiple insertions since the bend allows the filaments to act like springs and recover instead of taking a permanent compression set. The tops and bottoms of the coils can be mechanically removed by sawing, shaving, singulating, cutting and the like; as well as by wet chemical etching, for instance by first etching protruding coils to the elastomer,s surface, then dry or wet etching the elastomer.

Figure 14A:
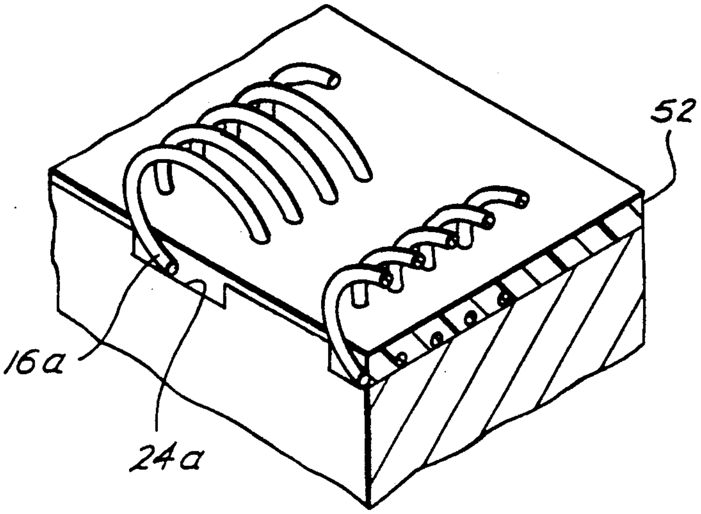
FIGS. 14A, 14B and 14C show another embodiment for backfilling the coils and curing the elastomeric mat wherein a temporary layer underlays a permanent elastomeric layer, the permanent elastomeric layer is cured, and the temporary layer is then removed.
Figure 14B:
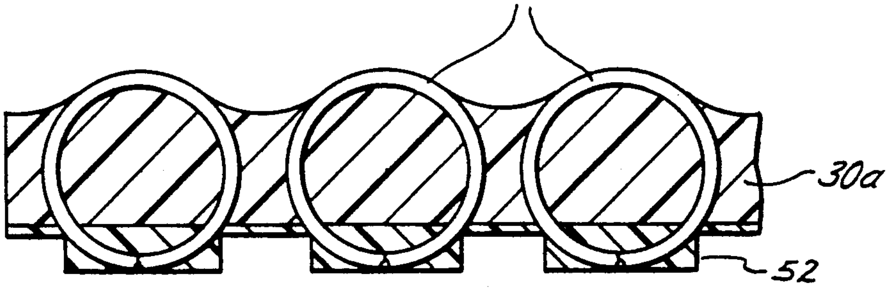
Figure 14C:
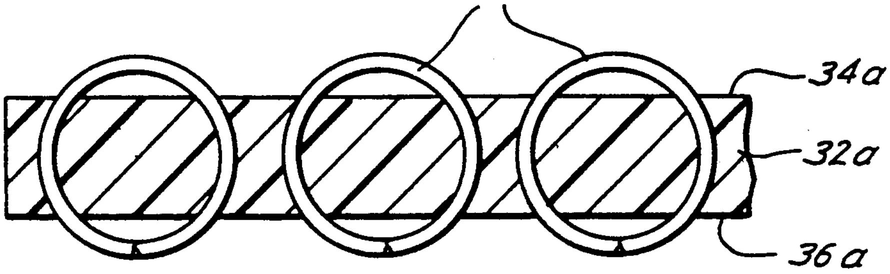

FIGS. 14A, 14B and 14C illustrate another embodiment for backfilling the coils and curing the elastomeric mat, wherein like parts to previous embodiments are similarly numbered with the addition of the suffix "a". This embodiment may be useful when the filaments are required to protrude a pre-determined distance above the top surface and below the bottom surface of the elastomeric mat. In FIG. 14A a temporary layer 52 fills grooves 24*a* and backfills a lower portion of coils 16*a*. Temporary layer 52 is then hardened sufficiently to hold coils 16*a* in place. In FIG. 14B an uncured permanent elastomeric layer 30*a* is deposited over temporary layer 52 and backfills an additional portion of coils 16*a*, including the centers thereof. Layer 30*a* is then cured (whereby uncured permanent layer 30*a* becomes cured permanent layer 32*a*). In FIG. 14C temporary layer 52 is removed without affecting permanent layer 32*a*. This is accomplished by exploiting some type of differential removability between layers 52 and 32*a*, such as of temporary layer 52 has a lower melting point, lower resistance to an etch, or higher solubility then permanent layer 32*a*. After the removal of temporary layer 52 the coil bottoms protrude from a relatively smooth bottom surface 36*a*. In addition, an etch can be applied to the elastomeric top surface 34*a* so that the coil tops protrude from a relatively smooth surface 34*a*.

The elastomeric material can be selected from numerous commercially available silicone polymers which provide a wide range of hardness, tear strength, and creep. Furthermore, the tops and bottoms of the filaments can ultimately be in and aligned with the top and bottom surfaces, respectively, of the elastomeric mat. Or the elastomeric material could cover the coils prior to curing, and then shrink during the cure to expose the tops and bottoms of the coils. The rows of wires could be held at their ends in a fixture while laying on a planar surface prior to backfilling the elastomer. Finally, the thermal conductivity of the elastomeric material may be improved by being filled with thermally conductive particles, for example 30% iron oxide by volume.

The present invention, therefore, is well adapted to carry out the objects and attain the ends and advantages mentioned, as well as others inherent therein without departing from the spirit of the invention which is intended to be limited only by the scope of the appended claims.

What is claimed is:

1. A method of making a metal-on-elastomer pressure contact connector, comprising the following steps in the sequence set forth:

embedding a metal wire comprising a plurality of axially spaced single-turn coils in an elastomer with top and bottom surfaces; and removing metal from the tops and bottoms of the coils to form a pair of isolated wire filaments from each coil which extend from the top surface of the bottom surface of the elastomer.

2. The method of claim 1, wherein the filaments have a contact density of at least 10,000 contacts per square inch, and an inductance of at most 100 picohenrys per filament.

3. The method of claim 1, wherein the mtal is copper-beryllia and the elastomer is a silicone material.

4. The method of claim 1, wherein the metal is removed by mechanical abrasion.

5. The method of claim 1, wherein the coils are coplanar.

6. The method of claim 1, wherein the coils have identical diameters.

7. The method of claim 6, wherein the coils have identical shapes.

8. The method of claim 1, wherein pitch between the coils is identical.

9. The method of claim 1, wherein each filament is adjacent to another filament with opposing curvature.

10. A method of making a metal-on-elastomer pressure contact connector, comprising the following steps in the sequence set forth:

winding a copper-beryllia wire around a rod to form a plurality of identically-shaped continuous coils;

removing the rod from the coils;

arranging the coils in parallel co-planar rows;

backfilling the coils with a layer of curable rubber silicone;

curing the rubber silicone to embed the coils in a silicone rubber mat comprising a top surface above the centers of the coils and a bottom surface below the centers of the coils; and mechanically abrading the tops and bottoms of the coils so that a pair of spaced wire filaments is formed from each coil;

wherein each filament protrudes a first uniform height above the top surface of the mat at a first end, protrudes a second uniform height below the bottom surface of the mat at a second end directly beneath and electrically connected to the first end, and is electrically isolated from the other filaments, the first ends form a first array of electrical contacts, and the second ends form a second array of electrical contacts.

11. A method of making a metal-on-elastomer pressure contact connector, comprising the following steps in the sequence set forth:

arranging a plurality of linear metal coiled wires on their sides in closely positioned, spaced, parallel co-planar rows wherein the wires comprise a plurality of axially spaced single-turn coils with identical diameters;

embedding the metal wires in an elastomeric mat comprising a top surface above the centers of the coils and a bottom surface below the centers of coils; and removing metal from the tops and bottoms of the coils to form a pair of isolated wire filaments from each coil which extend from the top surface to the bottom surface of the elastomeric mat such that each filament is adjacent to another filament with opposing curvature.

12. The method of claim 11, wherein the wire filaments form a first array above the elastomeric mat and a second array below the elastomeric mat.

13. The method of claim 12, wherein the metal is copper-beryllia and the elastomeric mat is a silicone material.

14. The method of claim 12, further comprising positioning the connector between a first electrical contact above the top surface and a second electrical contact below the bottom surface, and applying a pressure to force the contacts against the wire filaments, thereby electrically connecting the contacts.

15. The method of claim 12, wherein each wire filament has an inductance of at most 100 picohenrys, and each array has a contact density of at least 10,000 contacts per square inch.

16. A method of making a metal-on-elastomer pressure contact connector, comprising the following steps in the sequence set forth;

forming a plurality of linear coiled metal wires wherein each contains a plurality of identically shaped, axially spaced single-turn continuous coils;

arranging the coiled wires on their sides in closely positioned, spaced, parallel co-planar rows so that the center-to-center distance between the coiled wires is identical;

embedding the coils in an elastomeric mat comprising a top surface above the centers of the coils and a bottom surface below the bottoms of the cils; and removing the tops and bottoms of the coils so that a pair of spaced wire filaments is formed from each coil, wherein each filament terminates at a first end on or above the top surface of the elastomeric mat, terminates at a second end on or below the bottom surface of the elastomeric mat, the second end electrically connected to the first end, and is electrically isolated from the other filaments.

17. The method of claim 16, further comprising embedding a plurality of coils arranged in parallel rows in the elastomeric mat so that the first ends and second ends of the wire filaments form a first and second array of electrical contacts, respectively.

18. The method of claim 17, wherein each array contains at least 10,000 contacts per square inch.

19. The method of claim 17 wherein, for each wire filament, the first end is aligned directly above the second end.

20. The method of claim 16, wherein the first ends of the wire filaments extend a first uniform height above the top surface of the elastomeric mat, and the second ends of the wire filaments extend a second uniform height below the bottom surface of the elastomeric mat.

21. The method of claim 16, wherein the wire is copper-beryllia and the elastomeric mat is a silicone material.

22. The method of claim 16, wherein the step of embedding the coils in an elastomeric mat comprises backfilling the coils with a curable layer of elastomer, and curing the elastomer.

23.·The method of claim 22, further comprising applying an etch to at least one of said elastomer surfaces after curing the elastomer.

24. The method of claim 16, wherein the tops and bottoms of the coils are removed by sawing.

25. The method of claim 16, wherein the tops and bottoms of the coils are removed by belt grinding.

26. A method of making a metal-on-elastomer pressure contact connector, comprising the following steps in the sequence set forth:

winding an electrically conductive wire around a rod to form a plurality of continuous coils with identical diameters;

removing the rod from the coils;

placing the coils in parallel co-planar rows;

backfilling the coils with a layer of curable elastomer;

curing the elastomer to embed the coils in an elastomeric mat coprising a top surface above the centers of the coils and a bottom surface below the centers of the coils; and abrading the tops and bottoms of the coils so that a pair of spaced wire filaments is fomred from each coil, wherein each filament termiantes on or above the top surface of the mat at a first end, terminates on or below the bottom surface of the mat at a second directly beneath and electrically connected to the first end, and is electrically isolated from the other filaments, such that the first ends form a first array of electrical contacts and the second ends form a second arry of electrical contacts.

27. The method of claim 26, further including placing the coils includes putting the coils in parallel recessed grooves, filling the grooves and backfilling a lower portion of the coils with a temporary layer and hardening the temporary layer sufficients to hold the coils in place, backfilling the coils by depositing the layer of curable elastomer on the hardened temporary layer, and removing the hardened temporary layer after curing the elastomer without affecting the elastomeric mat so that the coil bottoms protrude from the bottom surface of the mat.

28. The method of claim 27, wherein the hardened temporary layer has a lower melting point than the elastomeric mat.

29. The method of claim 27, wherein the hardened temporary layer has a lower resistance to an etch than the elastomeric mat.

30. The method of claim 27, wherein the hardened temporary layer has a high solubility than the elastomeric mat.

31. A method of making a metal-on-elastomer pressure contact connector, comprising the following steps in the sequence set forth;

placing a metal wire comprising a plurality of coils in a recessed groove;

filling a temporary layer into the groove thereby backfilling a lower portion of the coils;

hardening the temporary layer sufficiently to hold the coils in place;

depositing an uncured layer of elastomer on the hardened temporary layer thereby backfilling an additional portion of the coils;

curing the elastomer so as to embed the metal wire in a cured elastomer with top and bottom surfaces; and removin_ hardened temporary layer from the cured elastomer and removing metal from the tops and bottoms of the coils to form a pair of isolated wire filaments from each coil which extend from the top surface to the bottom surface of the cured elastomer.

32. The method of claim 31, wherein the hardened temporary layer is removed without affecting the cured elastomer.

33. The method of claim 31, wherein after removing the hardened temporary layer the cured elastomer has a relatively smooth bottom surface from which the coil bottoms protrude.

34. The method of claim 31, wherein the hardened temporary layer has a lower melting point than the cured elastomer.

35. The method of claim 31, wherein the hardened temporary layer has a lower resistance to an etch than the cured elastomer.

36. The method of claim 31, wherein the hardened temporary layer has a high solubility than the cured elastomer.

* * * * *